United States Patent [19]

Nagashima

[11] Patent Number: 4,571,639
[45] Date of Patent: Feb. 18, 1986

[54] DROPOUT COMPENSATION CIRCUIT FOR A VIDEO REPRODUCING SYSTEM

[75] Inventor: Yoshitake Nagashima, Chigasaki, Japan

[73] Assignee: Tokyo Shibaura Denki Kabushiki Kaisha, Japan

[21] Appl. No.: 495,416

[22] Filed: May 17, 1983

[30] Foreign Application Priority Data

May 20, 1982 [JP] Japan ................................ 57-85214

[51] Int. Cl.³ .......................................... H04N 9/491
[52] U.S. Cl. ..................................... 358/314; 358/328
[58] Field of Search ...................... 358/314, 327, 328; 360/38.1

[56] References Cited

U.S. PATENT DOCUMENTS

| | | | |
|---|---|---|---|
| 4,032,966 | 6/1977 | Kenney et al. | 358/314 X |
| 4,291,330 | 9/1981 | Hirai | 358/314 X |
| 4,368,483 | 6/1983 | Liu | 358/314 X |

Primary Examiner—Aristotelis M. Psitos
Attorney, Agent, or Firm—Finnegan, Henderson, Farabow, Garrett & Dunner

[57] ABSTRACT

A dropout compensation circuit for a video reproduction system includes a signal generating circuit for generating sum and difference signals corresponding to the sum and difference of the input chrominance and luminance signals, and for adding the difference and sum signals, after delaying the difference signal by one horizontal scanning period, to produce an output signal whose crosstalk component is eliminated, a signal separating circuit adapted to separate the chrominance and luminance signals from the delayed difference signal after delaying the delayed difference signal by one horizontal scanning period, and a signal selecting circuit adapted to supply the chrominance and luminance signals of the signal separating circuit to the signal generating circuit when it is determined that the reproduction signal is dropped out.

7 Claims, 6 Drawing Figures

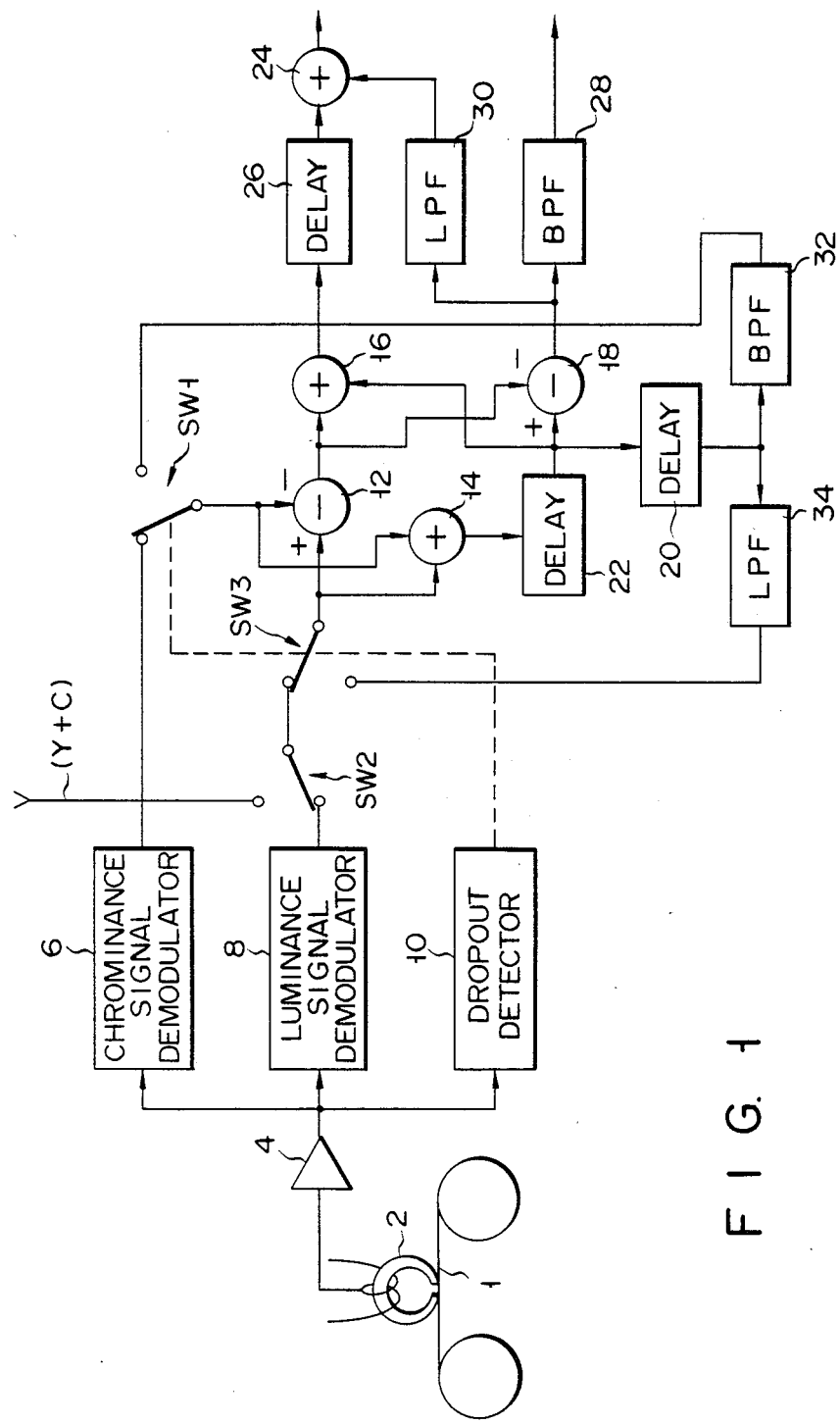
F I G. 1

DROPOUT COMPENSATION CIRCUIT FOR A VIDEO REPRODUCING SYSTEM

BACKGROUND OF THE INVENTION

This invention relates to a dropout compensation circuit for compensating for a dropped-out reproduction signal during the reproduction of a video signal.

A video tape recorder is known which is adapted to record and reproduce a video signal on a magnetic tape as a recording medium. Where the tape has scratches or dust particles on the surface, a video signal is not reproduced on that surface area of the tape, resulting in the dropout of a reproduction signal. If this occurs, image quality is degraded to a corresponding extent. Thus, a dropout compensation circuit is used to compensate for the dropout of the reproduction signal.

A conventional dropout compensation circuit permits the use of, in place of a dropped-out reproduction signal, the luminance signal component of a reproduction signal which is generated one horizontal scanning period prior to generation of the dropped-out reproduction signal. To obtain a better image quality, a signal including, not only a luminance signal component, but a chrominance signal component, must be used in place of the dropped-out reproduction signal.

To record more image signals per unit length on the tape of a home video tape recorder, the video tracks are mutually adjacently arranged without providing any guide band between the video tracks. The video signal recorded on the adjacent tracks is sequentially reproduced through two video heads. Where a video signal recorded on a certain video track is to be reproduced, the portion of the video signal recorded on the adjacent video track is also reproduced, causing the corresponding partial reproduction signal to be mixed, as a crosstalk component, with the main reproduction signal. However, in the luminance signal present in the high frequency region, no crosstalk occurs due to the azimuth loss. In the home video tape recorder, it is necessary to eliminate the crosstalk component mixed with the chrominance signal. For example, a phase inverting (PI) method is adopted in a β-system video tape recorder, while a phase shifting (PS) method is adopted in a VHS-system video tape recorder.

In the PI method, a video signal is recorded on the corresponding video track through one of two video heads in such a way that the phase of the chrominance signal is inverted for each horizontal scanning period. The video signal is recorded on the adjacent video track through the other video head such a way that the phase of the chrominance signal is not inverted. In the PS method, a video signal is recorded on the corresponding video track through one of two video heads in such a way that the phase of the chrominance signal is, for example, lagged by 90° for each horizontal scanning period. The video signal is recorded on the adjacent video track through the other video head in such a way that the phase of the chrominance signal is lead by 90° for each horizontal scanning period.

Where a chrominance signal recorded by the PI method or the PS method is to be reproduced, the reproduction chrominance signal is so processed that the chrominance signal may be given the same phase for each horizontal scanning period on the same video track. The crosstalk component included in the chrominance signal for each horizontal scanning period has a phase inverted for each horizontal scanning period.

When a chrominance signal recorded by the PI method and PS method is reproduced, if a chrominance signal included one horizontal period prior to generation of a present chrominance signal is used in the same manner as the compensation of the luminance signal, to compensate for a dropped-out reproduction signal, a crosstalk component will be mixed into the present reproduction signal.

SUMMARY OF THE INVENTION

An object of this invention is to provide a dropout compensation circuit for a video reproduction system adapted to compensate for a dropped-out reproduction signal and reproduce a video signal with no crosstalk component.

According to this invention, a dropout compensation circuit is provided which comprises a signal generating circuit for receiving chrominance and luminance signals of a video reproduction signal to generate sum and difference signals corresponding to the sum and difference of both input signals at the time of ordinary reproduction operations, and for adding the difference and sum signals, after delaying the difference signal by the horizontal scanning period, to produce an output signal with the crosstalk component eliminated; a delay circuit for causing the difference signal obtained at the signal generating circuit to be delayed by two horizontal scanning periods; a signal separating circuit for separating the chrominance and luminance signals from the output signal of the delay circuit; and a chrominance and luminance signal selecting circuit adapted to supply the chrominance and luminance signals of the signal separating circuit to the signal generating circuit in place of the chrominance and luminance signals of the video reproduction circuit, when the video reproduction signal is detected as being dropped out.

According to this invention, the signal generating circuit generates a signal including chrominance and luminance signals and having the crosstalk component eliminated. Where reproduction signal is dropped out, the chrominance and luminance signals are supplied from the signal separating circuit to the signal generating circuit to generate a signal including the chrominance and luminance signal in place of a dropped-out reproduction signal.

BRIEF DESCRIPTION OF THE DRAWINGS

FIG. 1 is a circuit diagram showing a portion of a video system including a dropout compensation circuit according to one embodiment of this invention;

DETAILED DESCRIPTION OF THE PREFERRED EMBODIMENT

Figure 2:
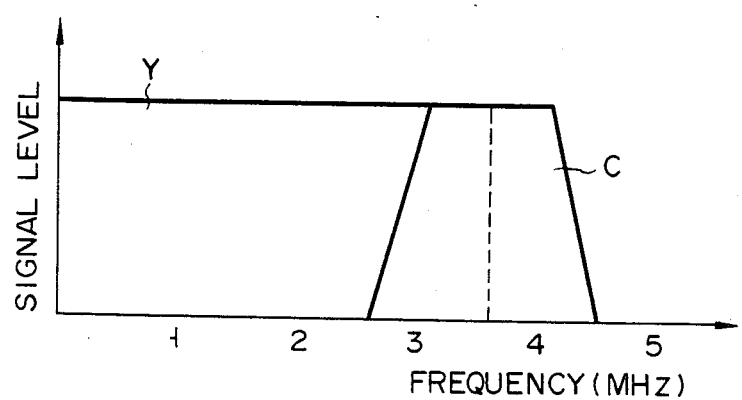
FIG. 2 shows the diagrammatic frequency characteristic of chrominance and luminance signals.

FIG. 1 shows a portion of a video system including a dropout compensation circuit according to one embodiment of this invention. The video system includes a magnetic tape 1 for recording a video signal, a video head 2 for reproducing the video signal from the magnetic tape 1 and an amplifying circuit 4 for amplifying the video signal from the video head 2 to supply it to a chrominance signal demodulator circuit 6, luminance signal demodulator circuit 8 and dropout detector circuit 10. The output terminal of the chrominance signal demodulator circuit 6 is connected, through a switch SW1 in the first switching position, to a first input terminal of a subtracter 12 and a first input terminal of an adder 14. The output terminal of the luminance signal demodulator circuit 8 is connected, through switches SW2 and SW3 in the first switching position, to a second input terminal of the subtracter 12 and a second input terminal of the adder 14 as will be explained in detail below, subtracter 12 and the adder 14 cooperatively constitute a signal generating circuit for generating sum $(Y+C)$ and difference $(Y-C)$ signals corresponding to the sum and difference of the chrominance and luminance signals from the chrominance signal demodulator circuit 6 and luminance signal demodulator circuit 8. The output terminal of the subtracter 12 is coupled to a first input terminal of an adder 16 and a first input terminal of a subtracter 18. The output terminal of the adder 14 is connected through a delay circuit 22 to second input terminals of the adder 16 and subtracter 18 and to the delay circuit 20. Thus, the delay circuits 22 and 20 cooperatively constitute a delay circuit for delaying the output signal of the adder 14 by two horizontal scanning periods. The output terminal of the adder 16 is connected through a delay circuit 26 to a first output terminal of an adder 24. The output terminal of the adder 18 is connected to a band-pass filter 28 and, through a low-pass filter 30, to a second input terminal of the adder 24.

The output terminal of the delay circuit 20 is connected, through a band-pass filter 32 and switch SW1 in the second switching position, to the first input terminals of the subtracter 12 and adder 14; and, through a low-pass filter 34 and switch SW3 in the second switching position, to the second input terminals of the subtracter 12 and adder 14. Thus, the switch SW1 acts as a chrominance signal selecting circuit for selectively supplying to subtracter 12 and adder 14 the chrominance signals from either the chrominance signal demodulator circuit 6 or the band pass filter 32, and the switch SW3 acts as a luminance signal selecting circuit for selectively supplying to subtracter 12 and adder 14 the luminance signals from either the luminance signal demodulator circuit 8 or the low pass filter 34.

The chrominance signal demodulator circuit 6 demodulates a chrominance signal recorded on the magnetic tape 1 by the PI method or the PS method. In this case, the chrominance signal demodulator circuit 6 demodulates a chrominance signal C in such a way that the chrominance signal component may be given the same phase for each horizontal scanning period. The luminance signal demodulator circuit 8 demodulates a luminance signal Y from the reproduced signal which is supplied from the video head 2.

When the dropout detector circuit 10 detects that the reproduction signal from the video head 2 is dropped out, it produces a switch control signal, causing the switches SW1 and SW3 to be set at the second switching position. With the switch SW2 in the recording mode, it is set to the second switching position and a sum signal $(Y+C)$ of luminance signal Y and chrominance signal C is externally supplied, through the switches SW2 and SW3, to the subtracter 12 and adder 14.

The delay circuits 20 and 22 each delay the input signal by one horizontal scanning period (1H) and are comprised of, e.g., a charge coupled device. The delay circuit 26 is so constructed as to have a delay time corresponding to the signal delay time of the band-pass filter 28 and low-pass filter 30. The output signal of the adder 16 is supplied to the adder 24 with substantially the same timing as that of the output signal from the low-pass filter 30, and the output signal of the adder 24 is produced with substantially the same timing as that of the output signal of the band-pass filter 28.

The band-pass filters 28 and 32 extract the respective chrominance signal components from the output signals of the subtracter 18 and delay circuit 20, and the low-pass filters 30 and 34 extract the respective luminance signal components from the output signals of the subtracter 18 and delay circuit 20. Thus, the low pass filter 30 and the band pass filter 32 cooperatively constitute a signal separating circuit for separating the output signal of the delay circuit 20 into chrominance and luminance signal components.

FIG. 2 shows a diagrammatic frequency characteristic of the chrominance signal C and luminance signal Y, respectively, from the chrominance signal demodulator circuit 6 and luminance signal demodulator circuit 8. As is evident from FIG. 2, the chrominance signal C has a band width of 3.58 MHz±about 0.5 MHz and the luminance signal Y has a band width of 0 to about 3 MHz.

Now suppose that a video signal from the magnetic tape 1 is reproduced without being dropped out.

In this case, with the switches SW1 to SW3 in the first switching positions, as shown in FIG. 1, a chrominance signal $(-C)$ from the chrominance signal demodulator circuit 6 is supplied to the first input terminals of the subtracter 12 and adder 14, and a luminance signal Y from the luminance signal demodulator circuit 28 is supplied to the second input terminals of the subtracter 12 and adder 14. A signal $[Y-(-C)]$, i.e., $[Y+C]$ is obtained from the subtracter 12 and a signal $[Y+(-C)]$, i.e., $[Y-C]$ is obtained from the adder 14. It is to be noted that the signal $(-C)$ has an inverting relation to the signal C.

Since the output signal $[Y-C]$ of the adder 14 is delayed by the delay circuit 22, by a period of 1H, the chrominance signal component $(-C)$ of the output signal $[Y-C]$ is phase inverted, causing the delay circuit to produce a signal $[Y+C]$. The adder 16 adds the output signal $[Y+C]$ from the subtracter 12 and output signal $[Y+C]$ from the delay circuit 22 to produce an output signal $2[Y+C]$. The subtracter 18 subtracts the output signal $[Y+C]$ of the delay circuit 22 from the output signal $[Y+C]$ of the delay circuit 12 to produce an output signal "0". Thus, the adder 24 produces an output signal two times as great as the signal $[Y+C]$.

An explanation will be given below of how the crosstalk components are cancelled for the output signal of the adder 24.

Figure 3A:
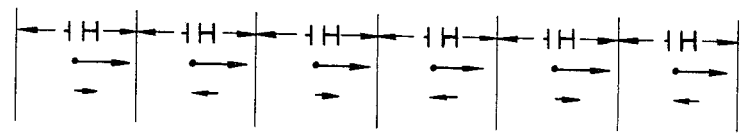
FIGS. 3A to 3D are explanatory views for illustrating a method for eliminating a crosstalk component.
Figure 3B:
Figure 3C:
Figure 3D:

As shown in FIG. 3A, the chrominance signal $(-C)$ of the chrominance signal demodulator circuit 6 is comprised of a reproduction main signal component, which is so reproduced as to have the same phase for each horizontal scanning period, and a crosstalk component having a phase inverted for each horizontal period. Since no crosstalk component is included in the luminance signal, the explanation given below will make no reference to the luminance signal. When the chrominance signal $(-C)$ passes through the subtracter 12, it is phase inverted. As shown in FIG. 3B, a chrominance signal C having a main signal component and crosstalk component phase-inverted with respect to the chrominance signal $(-C)$ is supplied to the first input terminal of the adder 16. The chrominance signal $(-C)$ passed through the adder 14 is supplied to the delay circuit 22, without being phase inverted, where it is delayed by one horizontal period. As a result, the chrominance signal (−C) is phase-inverted and, as shown in FIG. 3C, a chrominance signal C* having a main signal component and crosstalk component phase-inverted with respect to that of a chrominance signal generated one horizontal scanning period prior to generation of the above-mentioned chrominance signal, is supplied to the second input terminal of the adder 16. As a result, a chrominance signal including the main signal component and having the crosstalk component eliminated is derived from the adder 16 as shown in FIG. 3D.

Now suppose that the reproduction signal is dropped out in the reproduction mode. In such a case, the dropout detector circuit 10 causes the switches SW1 and SW3 to be set to the second switching position. At this time, a video signal is generated which has occurred one horizontal scanning period prior to the generation of the dropped-out signal. The delay circuit 20 delivers a video signal which has occurred two horizontal scanning periods prior to the generation of the dropped-out signal. When the video signal from the delay circuit 20 passes through the low-pass filter 34, the luminance signal component Y is extracted from the video signal and supplied as a correction signal, through the switch SW3, to the second input terminals of the subtracter 12 and adder 14. When the video signal from the delay circuit 20 passes through the band-pass filter 32, a chrominance signal component (−C) is extracted from the video signal and supplied as a correction signal, through the switch SW1, to the first input terminals of the subtracter 12 and adder 14. Since, in this case, the chrominance signal component from the band-pass filter 32 is delayed two horizontal scanning periods behind the chrominance signal from the chrominance signal demodulator circuit 6, the crosstalk component included in the chrominance signal component (−C) is placed in phase with the crosstalk components included in the chrominance signal generated by the demodulator circuit 6. As a result, during the horizontal scanning period following the horizontal scanning period in which the reproduced signal is dropped out, it is possible to obtain an output signal which is two times as great as a signal [Y+C] from the adder 24 and which includes no crosstalk component. When the successive reproduction signal is dropped out, the output signal of the delay circuit 20 is sequentially circulated. In this way, the output signal continues to be delivered from the adder 24. When the reproduction signal is no longer dropped out, the switches SW1 and SW3 are returned to their first switching position and the chrominance signal (−C) from the chrominance signal demodulator circuit 6 and luminance signal Y from the luminance signal demodulator circuit 8 are supplied to the subtracter 12 and adder 14, respectively.

In the recording mode, the switch SW2 is set in the second switching position and a video signal [Y+C] is supplied from an external circuit (not shown) to the second input terminals of the subtracter 12 and adder 14. Since the output signals of the chrominance signal demodulator circuit 6 and luminance signal demodulator circuit 8 are at the 0 level, the output signal [Y+C] is delivered from the subtracter 12 and adder 14. The output signal of the adder 14 is delayed by one horizontal scanning period by the delay circuit 22 and, consequently, an output signal [Y−C] is generated by the delay circuit 22. The adder 16 taking the sum of the output signals of the subtracter 12 and delay circuit 22 delivers an output signal [2Y], and the subtracter 18 taking the difference between the output signals of the subtracter 12 and delay circuit 22 delivers an output signal [−2C]. The output signal [2Y] of the adder 16 is delayed by the delay circuit 26 for a predetermined period and then added by the adder 24 to a signal component which is extracted from the signal Y through the low-pass filter 30 and which enhances a vertical image resolution. The output signal [−2C] of the subtracter 18 has its unwanted component eliminated through the band-pass filter 28. The output signals of the adder 24 and band-pass filter 28 are processed through a signal processing circuit (not shown) and recorded as a video signal on the magnetic tape.

Although this invention has been explained in connection with one embodiment, it is not restricted thereto. For example, a delay circuit for delaying the output signal of the adder 14 by two horizontal scanning periods may be used in place of the delay circuit 20.

What is claimed is:

1. A dropout compensation circuit for a color video reproducing system which receives chrominance and luminance signals of a video signal reproduced from a video recording medium, said compensation circuit comprising:

signal generating means for receiving at a first input terminal said luminance signals and at a second input terminal said chrominance signals which include a crosstalk component that is phase-inverted for each horizontal scanning period, and for generating sum and difference signals corresponding to the sum and difference of said chrominance and luminance signals;

first delay means for delaying said difference signals of said signal generating means by one horizontal scanning period;

adding means for adding said sum signals from said signal generating means and said delayed difference signals from said first delay means, to produce an output signal including said chrominance and luminance signals with said crosstalk component cancelled;

second delay means for delaying said difference signals of said signal generating means by two horizontal scanning periods;

signal separating means for separating said chrominance and luminance signals from said delayed difference signals of said second delay means;

dropout detection means for detecting dropout of said video signal to said signal generating means; and signal selecting means for applying said chrominance and luminance signals as reproduced from the video recording medium in an ordinary reproduction mode and supplying the reproduced chrominance and luminance signals to said signal generating means in an ordinary reproduction mode as indicated by detection of said video signal by said dropout detection means, and for applying said chrominance and luminance signals from said signal separating means to said signal generating means when the reproduced video signal is detected by said dropout detector means as being dropped out.

2. A dropout compensation circuit according to claim 1, wherein said signal generating means comprises a subtracter for subtracting an input chrominance signal from an input luminance signal and an adder for adding the input luminance signal and input chrominance signal.

3. A dropout compensation circuit according to claim 2, wherein said second delay means comprises a delay circuit connected to the output terminal of the first delay means to delay the output signal of the first delay means by one horizontal scanning period.

4. A dropout compensation circuit according to claim 3, wherein said signal separating means comprises a low-pass filter and band-pass filter having their input terminals connected to the output terminal of said second delay means.

5. A dropout compensation circuit according to claim 4, wherein said signal selecting means comprises a chrominance signal selecting circuit for selectively supplying either said chrominance signals from said video signal reproduced from a video recording medium or said chrominance signals from said signal separating means to said first input terminal of said signal generating means and a luminance signal selecting circuit for selectively supplying either said luminance signals from said video signal being reproduced or said luminance signals from said signal separating means to said second input terminal of said signal generating means; and said dropout detecting means supplies a control signal to said chrominance and luminance signal selecting circuits when said video signal being reproduced is detected as being dropped out to cause said chrominance and luminance signals from said signal separating means to be supplied to said first and second input terminals of said signal generating means.

6. A dropout compensation circuit according to claim 2, wherein said signal separating means comprises a low-pass filter and band-pass filter having their input terminals connected to the output terminal of said second delay means.

7. A dropout compensation circuit according to claim 2, wherein said signal selecting means comprises a chrominance signal selecting circuit for selectively supplying either said chrominance signals from said video signal reproduced from a video recording medium or said chrominance signals from said signal separating means to said first input terminal of said signal generating means and a luminance signal selecting circuit for selectively supplying either said luminance signals from said video signal being reproduced or said luminance signals from said signal separating means to said second input terminal of said signal generating means; and said dropout detecting means supplies a control signal to said chrominance and luminance signal selecting circuits when said video signal being reproduced is detected as being dropped out to cause said chrominance and luminance signals from said signal separating means to be supplied to said first and second input terminals of said signal generating means.

* * * * *